US012317051B2

(12) United States Patent
Mao et al.

(10) Patent No.: US 12,317,051 B2
(45) Date of Patent: May 27, 2025

(54) MULTIFUNCTIONAL SPEAKER DEVICE

(71) Applicant: AAC Technologies (Nanjing) Co., Ltd., Nanjing (CN)

(72) Inventors: Lubin Mao, Nanjing (CN); Yun Tang, Nanjing (CN); Jie Ma, Nanjing (CN); Fan Zhang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 247 days.

(21) Appl. No.: 18/313,385

(22) Filed: May 8, 2023

(65) Prior Publication Data

US 2024/0179472 A1 May 30, 2024

Related U.S. Application Data

(63) Continuation of application No. PCT/CN2022/144233, filed on Dec. 30, 2022.

(30) Foreign Application Priority Data

Nov. 25, 2022 (CN) ......................... 202223164663.6

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/025* (2013.01); *H04R 7/04* (2013.01); *H04R 7/18* (2013.01);
(Continued)

(58) Field of Classification Search
CPC .......... H04R 9/06; H04R 9/025; H04R 9/045; H04R 9/00; H04R 1/02; H04R 1/025;
(Continued)

(56) References Cited

U.S. PATENT DOCUMENTS

2019/0207498 A1* 7/2019 Mao ........................ H02K 35/02
2020/0245058 A1* 7/2020 Lee ......................... H04R 9/025
2024/0048913 A1* 2/2024 Cai ....................... H04R 1/2834

FOREIGN PATENT DOCUMENTS

CN 114466293 A * 5/2022 ............. H02K 33/18
CN 216531781 U * 5/2022 ........... H04R 1/2811
(Continued)

*Primary Examiner* — Ahmad F. Matar
*Assistant Examiner* — Sabrina Diaz
(74) *Attorney, Agent, or Firm* — Wiersch Law Group

(57) ABSTRACT

A multifunctional speaker device is provided and includes a housing with an accommodating space, a sounder in the accommodating space, a motor assembly, and an auxiliary magnetic circuit unit. The sounder includes a frame, a vibration unit, and a magnetic circuit unit. The motor assembly includes an elastic member and a vibrator including driving coils. The vibrator. The driving coils are located at a side of the magnetic circuit unit away from the vibration unit. The auxiliary magnetic circuit unit is fixed to a side of the housing away from the vibrator and is directly opposite to and spaced apart from the magnetic circuit unit. The driving coils are spaced apart from each other between the magnetic circuit unit and the auxiliary magnetic circuit unit. The multifunctional speaker device provided by the disclosure can greatly enhance performance of the motor and sounder, and achieve good user experience.

10 Claims, 4 Drawing Sheets

(51) Int. Cl.
*H04R 7/04* (2006.01)
*H04R 7/18* (2006.01)
*H04R 9/02* (2006.01)
*H04R 9/04* (2006.01)

(52) U.S. Cl.
CPC ............. *H04R 9/025* (2013.01); *H04R 9/045* (2013.01); *H04R 2400/11* (2013.01)

(58) Field of Classification Search
CPC ........ H04R 7/04; H04R 7/18; H04R 2400/11; H04R 29/00; H04R 29/003
USPC ................................. 381/332, 177, 396, 412
See application file for complete search history.

(56) References Cited

FOREIGN PATENT DOCUMENTS

| | | | | | |
|---|---|---|---|---|---|
| CN | 114745644 | A | * | 7/2022 | ............. H04R 9/025 |
| CN | 115002624 | A | * | 9/2022 | ............... H04R 9/02 |
| CN | 114257919 | B | * | 7/2024 | ............... H04R 1/24 |
| KR | 2006009637 | A | * | 2/2006 | ............. H02K 15/02 |
| WO | WO-2023005759 | A1 | * | 2/2023 | ............... H04R 1/02 |

* cited by examiner

A-A

MULTIFUNCTIONAL SPEAKER DEVICE

TECHNICAL FIELD

The disclosure relates to the field of electro-acoustic conversion, and in particular to a multifunctional speaker device for an electronic speaker product.

BACKGROUND

With the advent of the Internet era, the number of smart mobile devices is soaring. Among numerous mobile devices, mobile phones are undoubtedly the most common and most portable mobile terminal devices. At present, mobile phones have extremely diverse functions, including a high-quality music playback function and a high-quality vibration function. Therefore, speaker units with a vibration function and a sound playback function have been widely applied to today's smart mobile devices.

In a related art, a speaker unit includes a housing, a sounder accommodated in the housing, and a motor vibration unit accommodated in the housing. The sounder includes a frame, a vibration unit fixed to the frame, and a magnetic circuit unit fixed to the frame and having a magnetic gap. The motor vibration unit is attached to a side of the magnetic circuit unit away from the vibration unit.

However, for the sounder and the motor vibration unit of the speaker unit in the related art, the motor vibration unit is stacked under the sounder simply in one-to-one correspondence. The magnetic force applied by the sounder to the motor vibration unit is constant. Meanwhile, the magnetic circuit unit of the sounder drives the vibration unit and the motor vibration unit. The motor has a small driving force to cause poor acoustic performance and vibration performance of the speaker unit.

Therefore, it is necessary to provide a novel multifunctional speaker device to solve the above technical problem.

SUMMARY

An objective of the disclosure is to provide a multifunctional speaker device with a large driving force, a good vibration effect, and desirable acoustic performance.

The disclosure provides a multifunctional speaker device. The multifunctional speaker device includes a housing with an accommodating space, a sounder accommodated in the accommodating space, a motor assembly accommodated in the accommodating space, and an auxiliary magnetic circuit unit. The housing has a sound hole penetrating a side of the housing. The sounder includes a frame fixed to the housing, a vibration unit fixed to the frame, and a magnetic circuit unit having a magnetic gap and configured to drive the vibration unit to vibrate and produce sound. The motor assembly includes a vibrator provided at a side of the magnetic circuit unit away from the vibration unit, and an elastic member fixed to the housing and configured to suspend the vibrator in the accommodating space. The vibrator comprises driving coils located at a side of the magnetic circuit unit away from the vibration unit. The auxiliary magnetic circuit unit is fixed to a side of the housing away from the vibrator and is directly opposite to and spaced apart from the magnetic circuit unit, and the driving coils are spaced apart from each other and located between the magnetic circuit unit and the auxiliary magnetic circuit unit.

As an improvement, the auxiliary magnetic circuit unit includes a first main magnet fixed to the housing, and two first auxiliary magnets fixed to the housing and spaced apart from each other and located at two opposite sides of the first main magnet. The first main magnet and the first auxiliary magnets define an auxiliary magnetic gap directly opposite to the magnetic gap.

As an improvement, the auxiliary magnetic circuit unit further includes two second auxiliary magnets fixed to the housing and spaced apart from each other and located at another two opposite sides of the first main magnet.

As an improvement, the vibrator further includes a support plate fixed to the elastic member and suspended in the accommodating space though the elastic member, and weights fixed to the support plate and spaced apart from each other and located at two opposite sides of the magnetic circuit unit. The driving coils are fixed to the support plate.

As an improvement, the support plate includes a support plate body, two mounting grooves formed by recessing the support plate body, and a support connecting portion bending and extending from the support plate body toward the magnetic circuit unit. The support connecting portion is fixedly connected to the elastic member. The driving coils includes two driving coils respectively fixed in the two mounting grooves.

As an improvement, the magnetic circuit unit includes a second main magnetic circuit fixed to the housing, first auxiliary magnetic circuits, second auxiliary magnetic circuits, and an auxiliary pole plate fixed to the frame. The first auxiliary magnetic circuits and the second auxiliary magnetic circuits are spaced apart from the second main magnetic circuit to form the magnetic gap, the first auxiliary magnetic circuits are spaced apart from each other and located at two opposite sides of the second main magnetic circuit, the second auxiliary magnetic circuits are spaced apart from each other and located at another two opposite sides of the second main magnetic circuit, and the first auxiliary magnetic circuits and the second auxiliary magnetic circuits are fixed to a side of the auxiliary pole plate close to the vibrator.

As an improvement, the vibration unit includes a diaphragm, and a voice coil configured to drive the diaphragm to vibrate. The diaphragm includes an external suspension in a shape of an annulus and fixed to the frame, an internal suspension in a shape of an annulus and fixed to the second main magnetic circuit, and a vibration portion in a shape of an annulus and connecting the external suspension and the internal suspension. The second main magnetic circuit is fixed to a side of the housing close to the diaphragm in such a manner that the diaphragm and the housing are spaced apart from each other to form a front sound cavity. The front sound cavity communicates with the sound hole, and the voice coil is inserted into the magnetic gap.

As an improvement, the multifunctional speaker device further includes a fixing member. The fixing member is sandwiched between the auxiliary magnetic circuit unit and the second main magnetic circuit, and is fixedly connected to the auxiliary magnetic circuit unit and the second main magnetic circuit.

As an improvement, the multifunctional speaker device further includes a bracket provided with a sound leading channel and fixed to a side of the frame close to the diaphragm. The front sound cavity is connected to the sound hole through the sound leading channel.

As an improvement, the vibration unit further includes a first flexible conductive connector electrically connected to the voice coil. The first flexible conductive connector includes a first connecting portion fixed to a side of the diaphragm close to the magnetic circuit unit, a first elastic arm bending and extending from the first connecting portion, and a first extension portion passing through the housing and at least partially exposed out of the housing.

Compared with the related art, the multifunctional speaker device is provided by the disclosure. The multifunctional speaker device includes a housing with an accommodating space, a sounder accommodated in the accommodating space, a motor assembly accommodated in the accommodating space, and an auxiliary magnetic circuit unit. The housing has a sound hole penetrating a side of the housing. The sounder includes a frame fixed to the housing, a vibration unit fixed to the frame, and a magnetic circuit unit having a magnetic gap and configured to drive the vibration unit to vibrate and produce sound. The motor assembly includes a vibrator provided at a side of the magnetic circuit unit away from the vibration unit, and an elastic member fixed to the housing and configured to suspend the vibrator in the accommodating space. The vibrator comprises driving coils located at a side of the magnetic circuit unit away from the vibration unit. The auxiliary magnetic circuit unit is fixed to a side of the housing away from the vibrator and is directly opposite to and spaced apart from the magnetic circuit unit, and the driving coils are spaced apart from each other and located between the magnetic circuit unit and the auxiliary magnetic circuit unit. When the driving coils are energized, the magnetic circuit unit and the auxiliary magnetic circuit unit that are fixed to the housing each provide a driving force for the driving coils at the same time. The driving coils drive the vibrator to vibrate in a vibrating direction. This can make up a part of the driving force for the speaker unit, improves the driving force for the motor and the sounder, greatly enhances performance of the motor and the sounder, and achieves good user experience.

BRIEF DESCRIPTION OF DRAWINGS

To describe the technical solutions in the embodiments of the disclosure more clearly, the drawings required for describing the embodiments are briefly described below. Apparently, the drawings described below are merely some embodiments of the disclosure, and those of ordinary skill in the art may still obtain other drawings based on these drawings.

DETAILED DESCRIPTION OF EMBODIMENTS

The technical solutions in the embodiments of the disclosure are clearly and completely described below with reference to the drawings in the embodiments of the disclosure. Apparently, the embodiments described are a part, rather than all of the embodiments of the disclosure. All other embodiments obtained by those of ordinary skill in the art based on the embodiments in the disclosure without creative efforts should fall within the protection scope of the disclosure.

Figure 1:
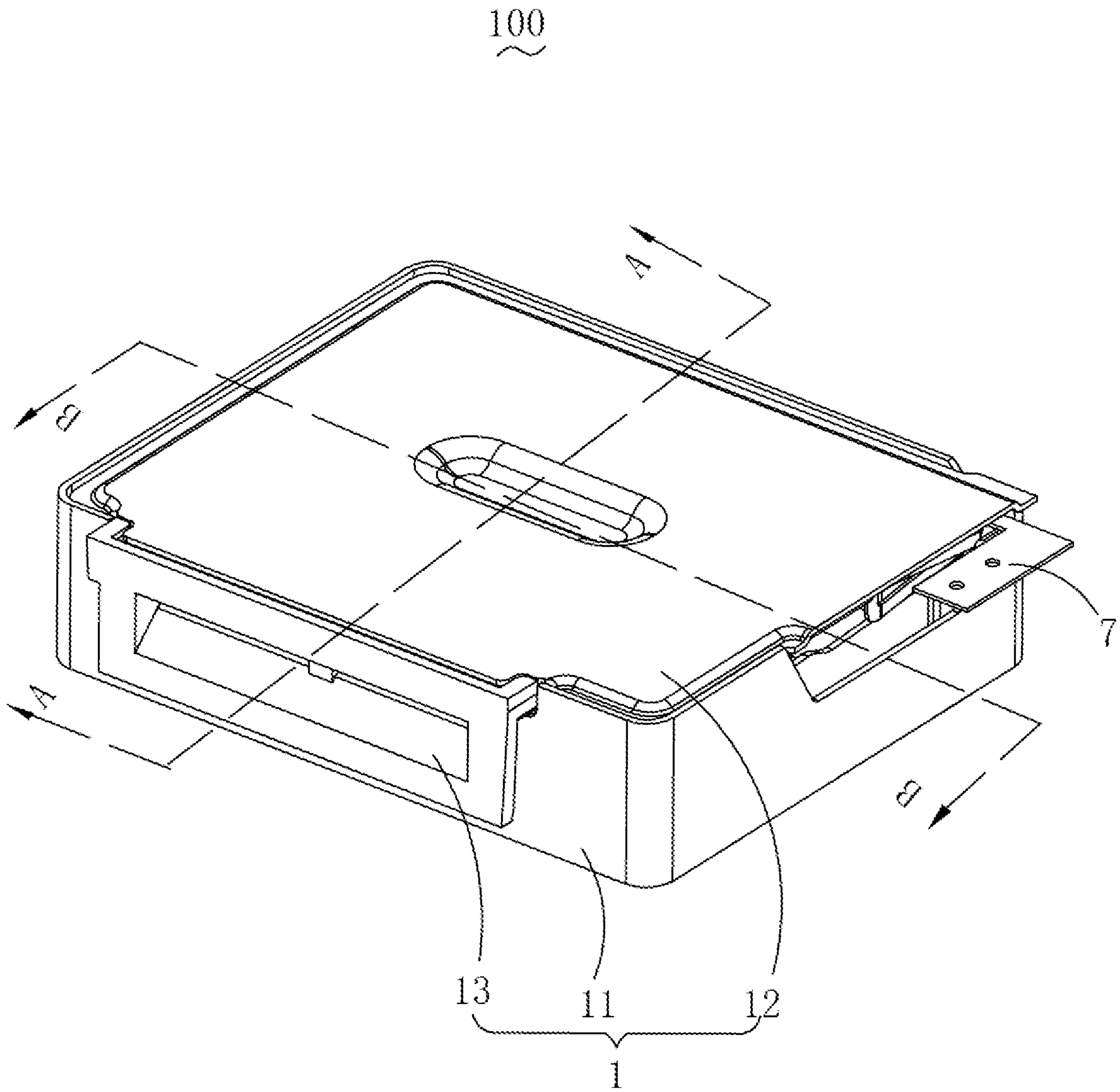
FIG. 1 is a perspective structural view of a multifunctional speaker device according to the disclosure.
Figure 2:
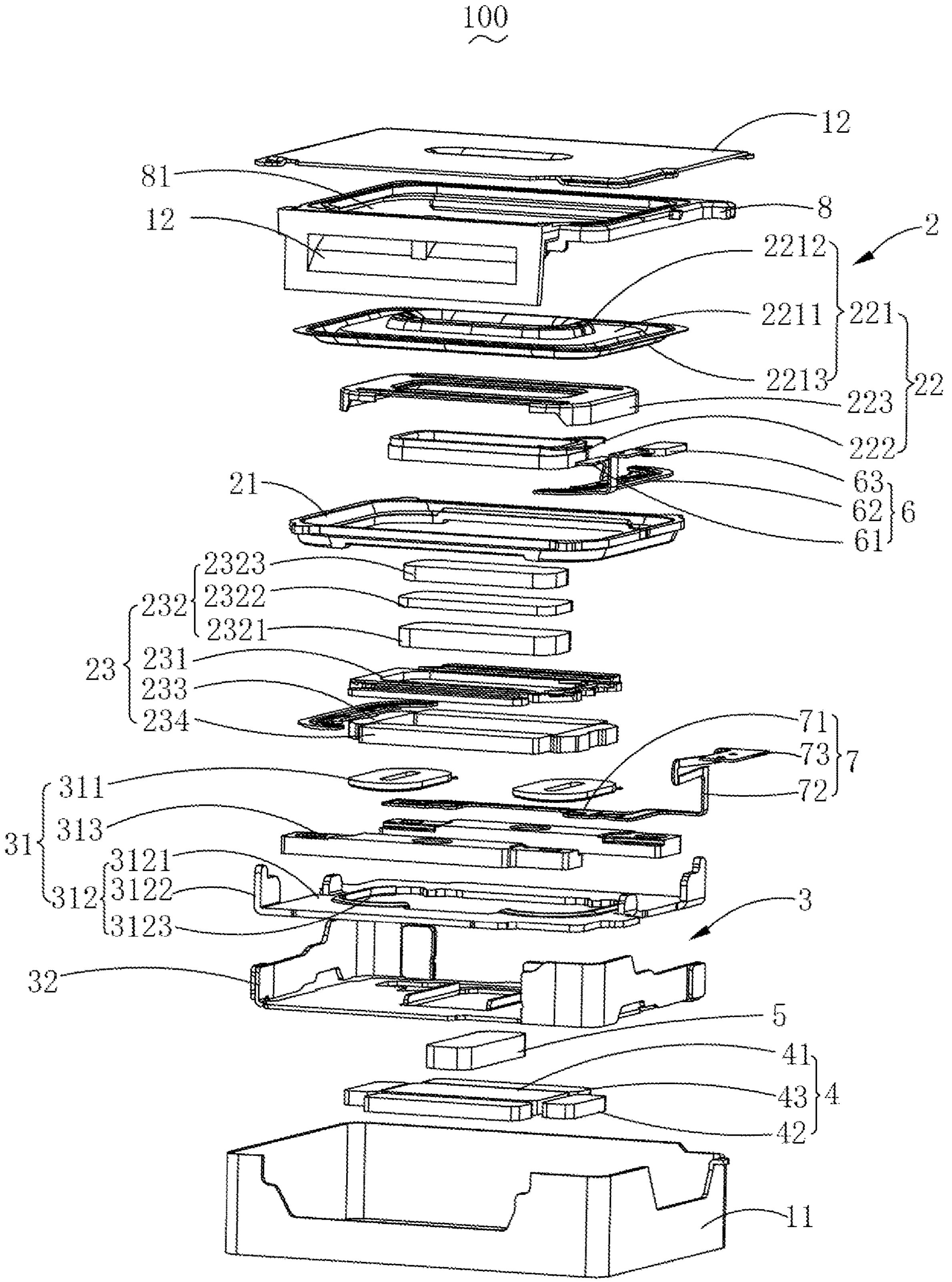
FIG. 2 is a partial perspective exploded view of a multifunctional speaker device according to the disclosure.
Figure 3:
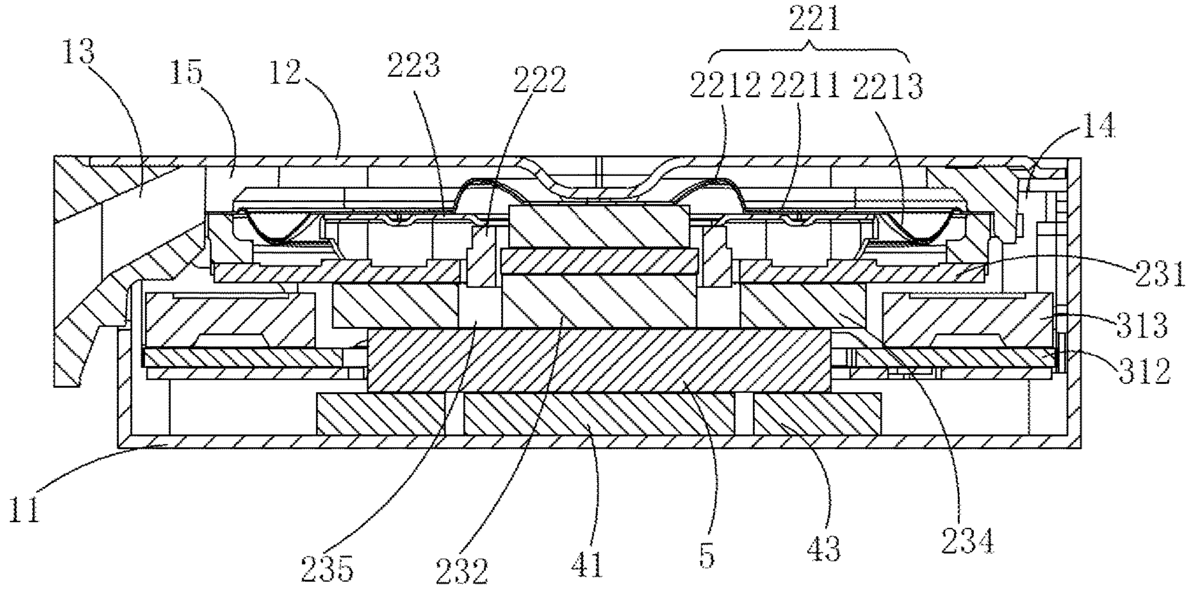
FIG. 3 is a sectional view along a line A-A shown in FIG. 1.
Figure 4:
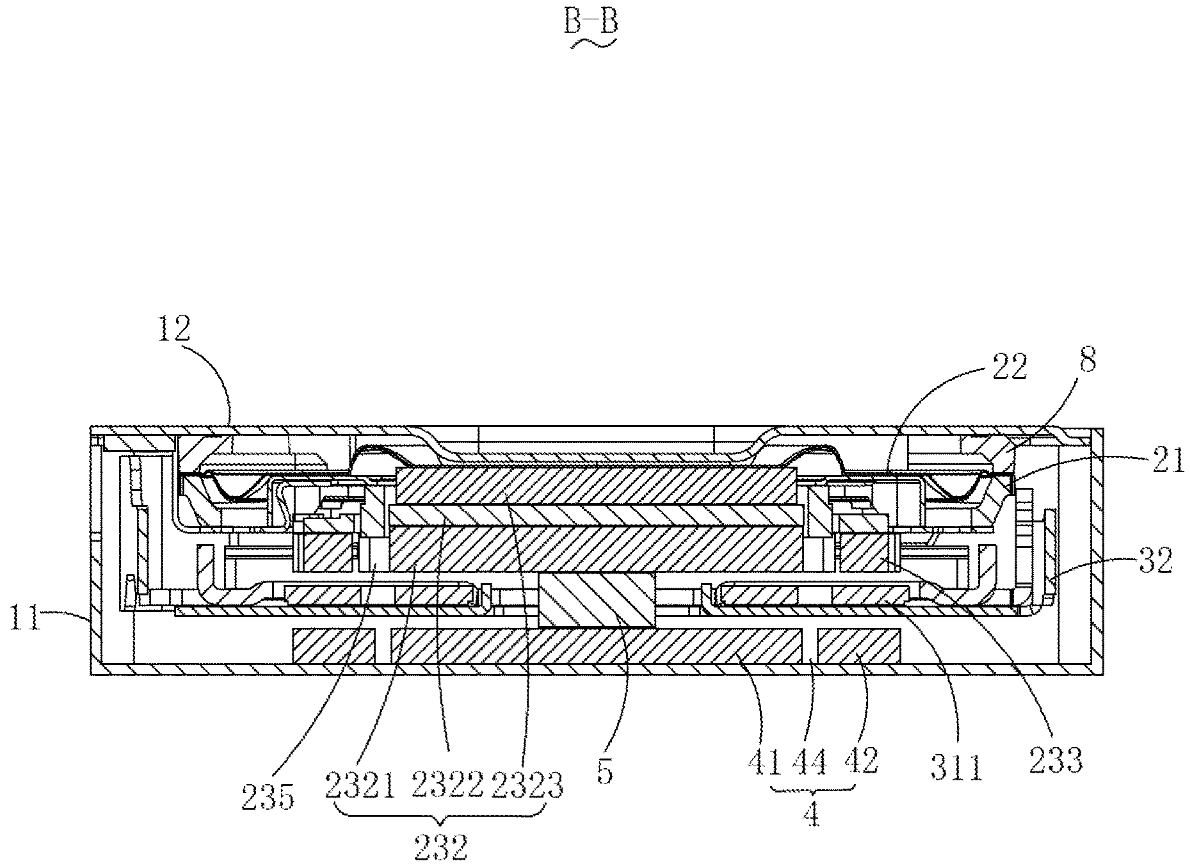
FIG. 4 is a sectional view along a line B-B shown in FIG. 1.

Referring to FIGS. 1-4, the disclosure provides a multifunctional speaker device 100, including a housing 1 provided with an accommodating space 14, and a sounder 2 accommodated in the accommodating space 14. The housing 1 has a sound hole 13 penetrating a side of the housing 1. The sounder 2 includes a frame 21 fixed to the housing 1, a vibration unit 22 fixed to the frame 21, and a magnetic circuit unit 23 having a magnetic gap 235 and configured to drive the vibration unit 22 to vibrate and produce sound. The sounder 2 is configured to vibrate and produce sound through the sound hole 13. The housing 1 is configured to protect and mount the sounder 2. The frame 21 is configured to mount and fix the vibration unit 22 and the magnetic circuit unit 23.

The multifunctional speaker device 100 further includes a motor assembly 3 accommodated in the accommodating space 14. The motor assembly 3 includes a vibrator 31 provided at a side of the magnetic circuit unit 23 away from the vibration unit 22, and an elastic member 32 fixed to the housing 1 and configured to suspend the vibrator 31 in the accommodating space 14. The vibrator 31 includes driving coils 311. The driving coils 311 are located at a side of the magnetic circuit unit 23 away from the vibration unit 22. The magnetic circuit unit 23 provides a driving force for the driving coils 311 in such a manner that the driving coils 311 drive the whole vibrator 31 to vibrate on the elastic member 32, which improves vibration performance of the motor assembly 3.

The multifunctional speaker device 100 further includes an auxiliary magnetic circuit unit 4. The auxiliary magnetic circuit unit 4 is fixed to a side of the housing 1 away from the vibrator 31. The auxiliary magnetic circuit unit 4 is directly opposite to and spaced apart from the magnetic circuit unit 23. The driving coils 311 are spaced apart from each other and located between the magnetic circuit unit 23 and the auxiliary magnetic circuit unit 4. The magnetic circuit unit 23 is spaced apart at a side of the vibrator 31 close to the vibration unit 22. The auxiliary magnetic circuit unit 4 is fixed to the housing 1 and spaced apart at a side of the vibrator 31 away from the vibration unit 22. In other words, the magnetic circuit unit 23 and the auxiliary magnetic circuit unit 4 are respectively spaced apart at two sides of the vibrator 31. When the driving coils 311 are energized, the magnetic circuit unit 23 and the auxiliary magnetic circuit unit 4 that are fixed to the housing 1 each provide a driving force for the driving coils 311 at the same time. The driving coils 311 drive the vibrator 31 to vibrate in its vibrating direction, which can make up a part of the driving force for the speaker unit, improves the driving force for the motor and the sounder 2, greatly enhances performance of the motor and the sounder 2, and achieves desirable user experience.

In an embodiment, the housing 1 includes a first housing 11 and a second housing 12 that covers and is fixed to the first housing 11. The first housing 11 includes a bottom wall and a sidewall bending and extending from the bottom wall toward the vibration unit 22. The elastic member 32 is fixed to the sidewall of the first housing 11. The auxiliary magnetic circuit unit 4 is fixed to the bottom wall of the first housing 11. The frame 21 is fixed to the second housing 12. The sound hole 13 is formed in the frame 21 and penetrates through one side of the sidewall of the first housing 11.

In an embodiment, the auxiliary magnetic circuit unit 4 includes a first main magnet 41 fixed to the housing 1, and two first auxiliary magnets 42 fixed to the housing 1 and spaced apart at two opposite sides of the first main magnet 41. The first main magnet 41 and the first auxiliary magnets 42 define an auxiliary magnetic gap 44 directly opposite to the magnetic gap 235. The driving coils 311 are spaced apart from each other and located at a side of the first main magnet 41 and the first auxiliary magnets 42 close to the magnetic circuit unit 23. Through a magnetic field formed by the first main magnet 41 and the two first auxiliary magnets 42, the driving coils 311 are driven to vibrate in a long-axis direction of the first main magnet 41, which enhances the vibration performance of the vibrator 31.

In an embodiment, the auxiliary magnetic circuit unit 4 includes two second auxiliary magnets 43 fixed to the housing 1 and spaced apart from each other and located at another two opposite sides of the first main magnet 41. Such configuration can enhance magnetic performance of the first main magnet 41 to improve the driving force for the driving coils 311.

In an implementation, the vibrator 31 includes a support plate 312 fixed to the elastic member 32 and suspended in the accommodating space 14 though the elastic member, and weights 313 fixed to the support plate 312 and spaced apart from each other and located at two opposite sides of the magnetic circuit unit 23. The driving coils 311 are fixed to the support plate 312. Another side of the elastic member 32 is fixed to the housing 1. The support plate 312 is configured to mount and fix the weights 313 and fix the driving coils 311. By fixing the support plate 312 to one side of the elastic member 32, and fixing the another side of the elastic member 32 to the housing 1, the magnetic circuit unit 23 and the auxiliary magnetic circuit unit 4 each provide the driving force for the driving coils 311 at the same time. Consequently, the driving coils 311 drive the support plate 312 to vibrate on the elastic member 32 back and forth in a vibrating direction of the driving coils 311.

The weights 313 are configured to balance weight to increase a weight of the vibrator 31, such that the vibrator 31 has a higher vibration amplitude and the motor assembly 3 outputs a higher acceleration, which improves vibration performance of the multifunctional speaker device 100 of the disclosure.

In an implementation, the support plate 312 includes a support plate body 3121, two mounting grooves 3123 formed by recessing the support plate body 3121, and a support connecting portion 3122 bending and extending from one side of the support plate body 3121 toward the magnetic circuit unit 23. The support connecting portion 3122 is fixedly connected to the elastic member 32. There are two driving coils 311. The two driving coils 311 are respectively fixed in the two mounting grooves 3123. The driving coils 311 are fixed desirably. The suspension of the support plate 312 with the elastic member 32 facilitates vibration of the whole vibrator 31 under driving of the magnetic circuit unit 23 and the auxiliary magnetic circuit unit 4, thereby improving the vibration performance and acoustic performance of the multifunctional speaker device 100.

In an implementation, the magnetic circuit unit 23 includes a second main magnetic circuit 232 fixed to the housing 1, first auxiliary magnetic circuits 233, second auxiliary magnetic circuits 234, and an auxiliary pole plate 231 fixed to the frame 21. The first auxiliary magnetic circuits 233 and the second auxiliary magnetic circuits 234 are respectively spaced apart from the second main magnetic circuit 232 to form the magnetic gap 235. The first auxiliary magnetic circuits 233 are spaced apart at two opposite sides of the second main magnetic circuit 232. The second auxiliary magnetic circuits 234 are spaced apart at another two opposite sides of the second main magnetic circuit 232. The first auxiliary magnetic circuits 233 and the second auxiliary magnetic circuits 234 are fixed to a side of the auxiliary pole plate 231 close to the vibrator 31. The second main magnetic circuit 232 is configured to drive the first auxiliary magnetic circuits 233 and the second auxiliary magnetic circuits 234, thereby providing a driving force for the driving coils 311, and allowing the vibrator 31 to vibrate in the vibrating direction. Such configuration improves the driving force for the motor and the sounder 2, and enhances the performance of the motor and the sounder 2.

As an improvement, two first auxiliary magnetic circuits 233 are spaced apart from each other in a long-axis direction of the second main magnetic circuit 232. Two second auxiliary magnetic circuits 234 are spaced apart from each other in a short-axis direction of the second main magnetic circuit 232. The first auxiliary magnetic circuits 233 and the second auxiliary magnetic circuits 234 are all auxiliary magnets, and spaced apart from the second main magnetic circuit 232 to form the magnetic gap 235.

In an implementation, the multifunctional speaker device 100 includes a fixing member 5. The fixing member 5 is sandwiched between the auxiliary magnetic circuit unit 4 and the second main magnetic circuit 232, and fixedly connected to the auxiliary magnetic circuit unit 4 and the second main magnetic circuit 232. The second main magnetic circuit 232 is fixed and supported by the fixing member 5, which facilitates mounting and fixation of the second main magnetic circuit 232. In an embodiment, the housing 1 and the fixing member 5 are fixed to two sides of the second main magnetic circuit 232, respectively, so that the second main magnetic circuit 232 is fixed more stably.

The fixing member 5 is made of a non-magnetic material and is configured to insulate from a magnetic field formed between the magnetic circuit unit 23 and the auxiliary magnetic circuit unit 4 to provide the driving forces for the driving coils 311. Meanwhile, the magnetic circuit unit 23 can provide a driving force for the vibration unit 22 to achieve strong anti-interference performance. In some embodiments, the non-magnetic material may be plastic, ceramic, etc.

In the implementation, the second main magnetic circuit 232 includes a third main magnet 2321 fixed to a side of the fixing member 5 away from the vibrator 31, a main pole plate 2322 stacked and fixed to a side of the third main magnet 2321 close to the vibration unit 22, and a second main magnet 2323 stacked and fixed to a side of the main pole plate 2322 close to the vibration unit 22. An upper side of the second main magnet 2323 is fixed to the housing 1. Such configurations can enhance magnetic performance of the second main magnetic circuit 232. A magnetic field formed by the second main magnetic circuit 232, the first auxiliary magnetic circuits 233 and the second auxiliary magnetic circuits 234 is strengthened to provide the driving force for the vibration unit 22 and the driving coils 311 of the motor assembly 3. Therefore, the desirable driving effect is achieved.

In an implementation, the vibration unit 22 includes a diaphragm 221 fixed to the frame 21, and a voice coil 222 inserted into the magnetic gap 235 and configured to drive the diaphragm 221 to vibrate. The sound hole 13 is formed in a side of the frame 21. The diaphragm 221 and the housing 1 define the accommodating space 14.

In an embodiment, the diaphragm 221 includes an external suspension 2213 fixed to the frame 21, an internal suspension 2212 fixed to the second main magnetic circuit 232, and an annular vibration portion 2211 connecting the external suspension 2213 and the internal suspension 2212. The second main magnetic circuit 232 is fixed to a side of the housing 1 close to the diaphragm 221, and configure to space the diaphragm 221 and the housing 1 apart to form a front sound cavity 15. The front sound cavity 15 communicates with the sound hole 13. The voice coil 222 is inserted into the magnetic gap 235.

In an embodiment, the vibration unit 22 includes an annular holder 223 fixed to a side of the vibration portion 2211 close to the magnetic circuit unit 23. The voice coil 222 is suspended and fixed to a side of the holder 223 away from the internal suspension 2212. The voice coil 222 is inserted into the magnetic gap 235.

In an embodiment, the multifunctional speaker device 100 includes a bracket 8 provided with a sound leading channel 81. The bracket 8 is fixed to a side of the frame 21 close to the diaphragm 221. The front sound cavity 15 is connected to the sound hole 13 through the sound leading channel 81.

In an implementation, the vibration unit 22 includes a first flexible conductive connector 6 electrically connected to the voice coil 222. The first flexible conductive connector 6 includes a first connecting portion 61 fixed to a side of the diaphragm 221 close to the magnetic circuit unit 23, a first elastic arm 62 bending and extending from the first connecting portion 61, and a first extension portion 63 passing through the housing 1 and at least partially exposed out of the housing 1. For example, the first flexible conductive connector 6 is a flexible printed circuit (FPC), with desirable elasticity and conductivity.

In an implementation, the motor assembly 3 includes a second flexible conductive connector 7 electrically connected to the driving coils 311. The second flexible conductive connector 7 includes a second connecting portion 71 fixed to the support plate 312 and electrically connected to the driving coils 311, a second elastic arm 72 bending and extending from the second connecting portion 71, and a second extension portion 73 passing through the housing 1 and at least partially exposed out of the housing 1. For example, the second flexible conductive connector 7 is an FPC, with desirable elasticity and conductivity.

Compared with the related art, the multifunctional speaker device is provided by the disclosure. The multifunctional speaker device includes a housing with an accommodating space, a sounder accommodated in the accommodating space, a motor assembly accommodated in the accommodating space, and an auxiliary magnetic circuit unit. The housing has a sound hole penetrating a side of the housing. The sounder includes a frame fixed to the housing, a vibration unit fixed to the frame, and a magnetic circuit unit having a magnetic gap and configured to drive the vibration unit to vibrate and produce sound. The motor assembly includes a vibrator provided at a side of the magnetic circuit unit away from the vibration unit, and an elastic member fixed to the housing and configured to suspend the vibrator in the accommodating space. The vibrator comprises driving coils located at a side of the magnetic circuit unit away from the vibration unit. The auxiliary magnetic circuit unit is fixed to a side of the housing away from the vibrator and is directly opposite to and spaced apart from the magnetic circuit unit, and the driving coils are spaced apart from each other and located between the magnetic circuit unit and the auxiliary magnetic circuit unit. When the driving coils are energized, the magnetic circuit unit and the auxiliary magnetic circuit unit that are fixed to the housing each provide a driving force for the driving coils at the same time. The driving coils drive the vibrator to vibrate in a vibrating direction. This can make up a part of the driving force for the speaker unit, improves the driving force for the motor and the sounder, greatly enhances performance of the motor and the sounder, and achieves good user experience.

The above described are merely implementations of the disclosure. It should be noted here that those of ordinary skill in the art may make improvements without departing from the concept of the disclosure, but such improvements should fall within the protection scope of the disclosure.

What is claimed is:

1. A multifunctional speaker device, comprising:

a housing with an accommodating space, wherein the housing has a sound hole penetrating a side of the housing;

a sounder accommodated in the accommodating space, wherein the sounder comprises a frame fixed to the housing, a vibration unit fixed to the frame, and a magnetic circuit unit having a magnetic gap and configured to drive the vibration unit to vibrate and produce sound;

a motor assembly accommodated in the accommodating space, wherein the motor assembly comprises a vibrator provided at a side of the magnetic circuit unit away from the vibration unit, and an elastic member fixed to the housing and configured to suspend the vibrator in the accommodating space, wherein the vibrator comprises driving coils located at a side of the magnetic circuit unit away from the vibration unit; and an auxiliary magnetic circuit unit fixed to a side of the housing away from the vibrator, wherein the auxiliary magnetic circuit unit is directly opposite to and spaced apart from the magnetic circuit unit, and the driving coils are spaced apart from each other and located between the magnetic circuit unit and the auxiliary magnetic circuit unit.

2. The multifunctional speaker device as described in claim 1, wherein the auxiliary magnetic circuit unit comprises a first main magnet fixed to the housing, and two first auxiliary magnets fixed to the housing and spaced apart from each other and located at two opposite sides of the first main magnet, wherein the first main magnet and the two first auxiliary magnets define an auxiliary magnetic gap directly opposite to the magnetic gap.

3. The multifunctional speaker device as described in claim 2, wherein the auxiliary magnetic circuit unit further comprises two second auxiliary magnets fixed to the housing and spaced apart from each other and located at another two opposite sides of the first main magnet.

4. The multifunctional speaker device as described in claim 1, wherein the vibrator further comprises a support plate fixed to the elastic member and suspended in the accommodating space though the elastic member, and weights fixed to the support plate and spaced apart from each other and located at two opposite sides of the magnetic circuit unit; and the driving coils are fixed to the support plate.

5. The multifunctional speaker device as described in claim 4, wherein the support plate comprises a support plate body, two mounting grooves formed by recessing the support plate body, and a support connecting portion bending and extending from the support plate body toward the magnetic circuit unit, wherein the support connecting portion is fixedly connected to the elastic member; and the driving coils comprises two driving coils respectively fixed in the two mounting grooves.

6. The multifunctional speaker device as described in claim 1, wherein the magnetic circuit unit comprises a second main magnetic circuit fixed to the housing, first auxiliary magnetic circuits, second auxiliary magnetic circuits, and an auxiliary pole plate fixed to the frame, wherein the first auxiliary magnetic circuits and the second auxiliary magnetic circuits are spaced apart from the second main magnetic circuit to form the magnetic gap, the first auxiliary magnetic circuits are spaced apart from each other and located at two opposite sides of the second main magnetic circuit, the second auxiliary magnetic circuits are spaced apart from each other and located at another two opposite sides of the second main magnetic circuit, and the first auxiliary magnetic circuits and the second auxiliary magnetic circuits are fixed to a side of the auxiliary pole plate close to the vibrator.

7. The multifunctional speaker device as described in claim 6, wherein the vibration unit comprises a diaphragm, and a voice coil configured to drive the diaphragm to vibrate, wherein the diaphragm comprises an external suspension in a shape of an annulus and fixed to the frame, an internal suspension in a shape of an annulus and fixed to the second main magnetic circuit, and a vibration portion in a shape of an annulus and connecting the external suspension and the internal suspension; and the second main magnetic circuit is fixed to a side of the housing close to the diaphragm in such a manner that the diaphragm and the housing are spaced apart from each other to form a front sound cavity, wherein the front sound cavity communicates with the sound hole, and the voice coil is inserted into the magnetic gap.

8. The multifunctional speaker device as described in claim 7, further comprising:

a fixing member, wherein the fixing member is sandwiched between the auxiliary magnetic circuit unit and the second main magnetic circuit, and is fixedly connected to the auxiliary magnetic circuit unit and the second main magnetic circuit.

9. The multifunctional speaker device as described in claim 7, further comprising:

a bracket provided with a sound leading channel and fixed to a side of the frame close to the diaphragm, wherein the front sound cavity is connected to the sound hole through the sound leading channel.

10. The multifunctional speaker device as described in claim 7, wherein the vibration unit further comprises a first flexible conductive connector electrically connected to the voice coil, wherein the first flexible conductive connector comprises a first connecting portion fixed to a side of the diaphragm close to the magnetic circuit unit, a first elastic arm bending and extending from the first connecting portion, and a first extension portion passing through the housing and at least partially exposed out of the housing.

* * * * *